Jan. 6, 1925.　　　　I. RUDOLPH　　　　1,521,650
RADIOCABINET
Filed March 7, 1924　　　　2 Sheets-Sheet 1

INVENTOR
Isador Rudolph
BY
Joshua R H Potts
HIS ATTORNEY

Jan. 6, 1925.  
I. RUDOLPH  
1,521,650  
RADIOCABINET  
Filed March 7, 1924  
Sheets-Sheet 2

INVENTOR  
Isador Rudolph  
BY Joshua R. H. Potts  
HIS ATTORNEY

Patented Jan. 6, 1925.

1,521,650

UNITED STATES PATENT OFFICE

ISADOR RUDOLPH, OF PHILADELPHIA, PENNSYLVANIA.

RADIOCABINET.

Application filed March 7, 1924. Serial No. 697,432.

*To all whom it may concern:*

Be it known that I, ISADOR RUDOLPH, a citizen of the United States, residing at Philadelphia, in the county of Philadelphia and State of Pennsylvania, have invented certain new and useful Improvements in Radiocabinets, of which the following is a specification.

My invention relates to radio cabinets and more particularly to cabinets of the portable type. The objects are to provide a compact cabinet which will house a radio receiving unit, a loud speaking recorder, the batteries for the receiving unit and the loud speaker, and the aerial; which will be so constructed that access to the interior of the receiving unit, the batteries and their connections may be readily had, and which will have the lid of the cabinet so arranged that it may be used to regulate the volume of sound from the loud speaking unit.

These objects, and other advantageous ends which will be described hereinafter, I attain in the following manner, reference being had to the accompanying drawings in which—

Figure 1:
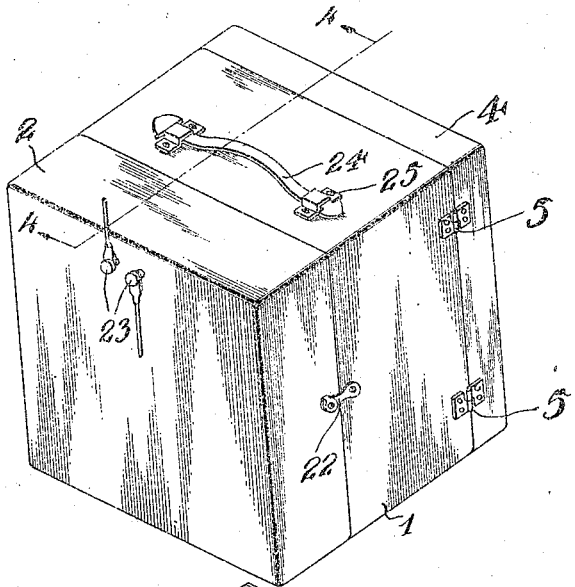
Figure 2:
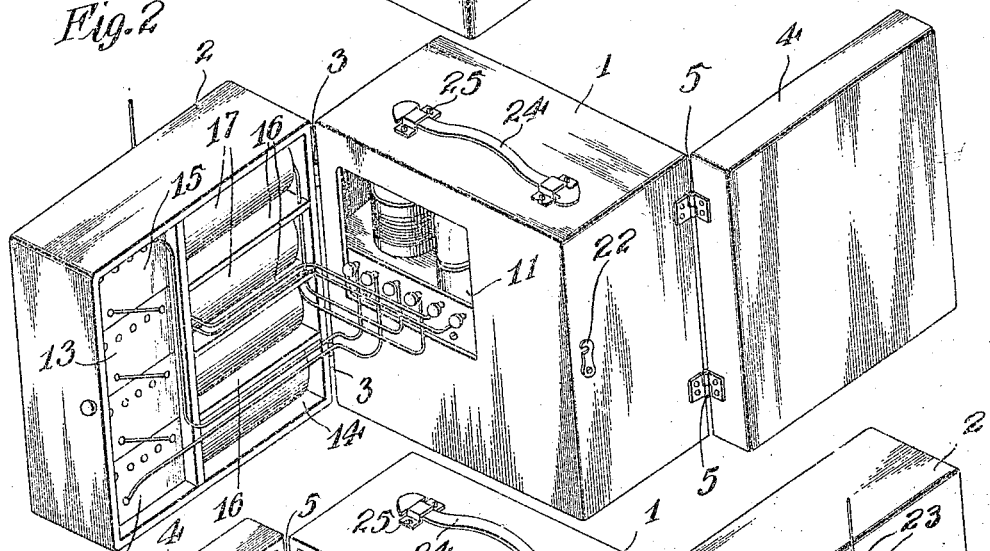
Figure 3:
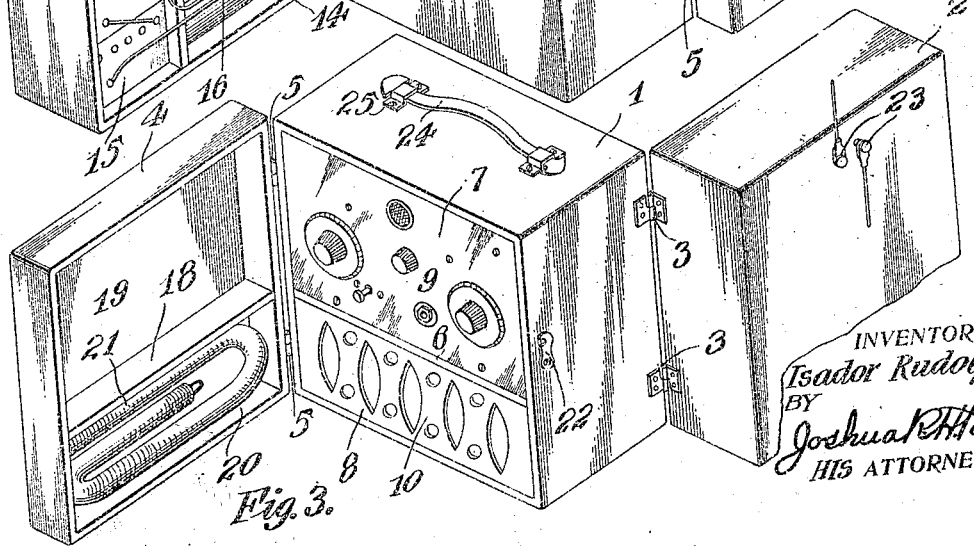
Figure 4:
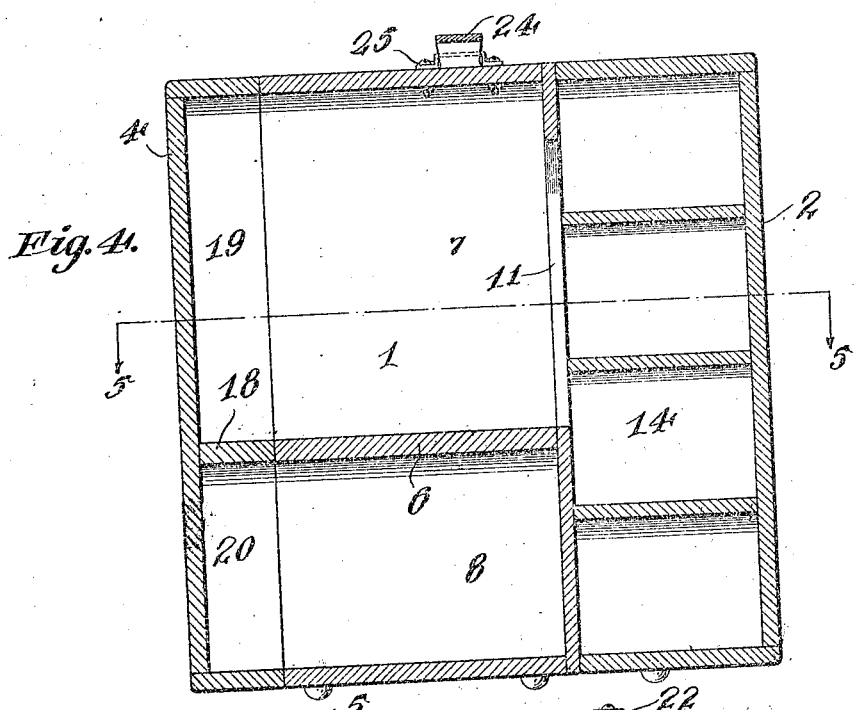
Figure 5:
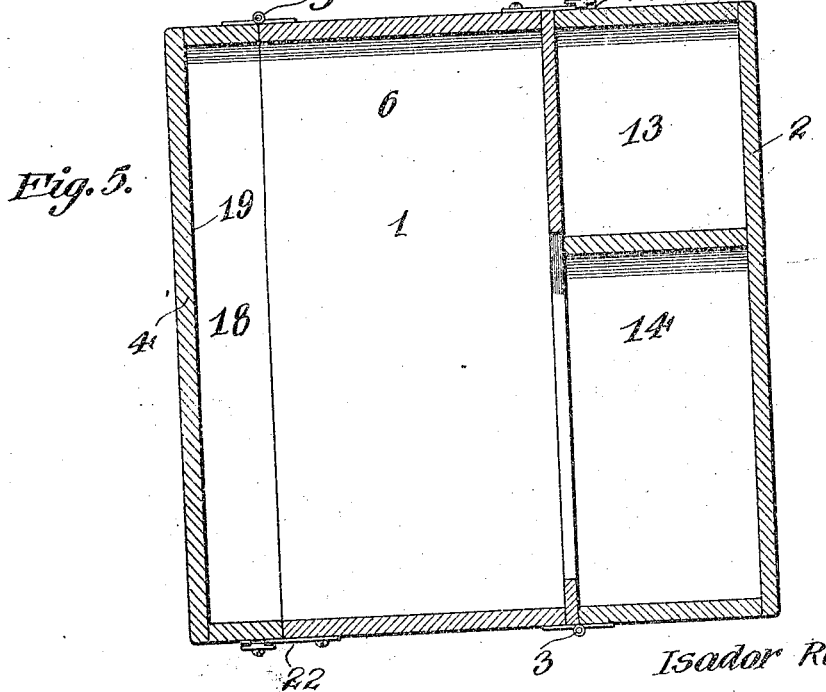

Figure 1 is a perspective view of a radio cabinet constructed in accordance with my invention, Figure 2 a perspective view of the cabinet shown in Figure 1 illustrating the rear of the same in an open position, Figure 3 a view similar to Figure 2 illustrating the front of the cabinet in an open position, Figure 4 is an enlarged section on line 4—4 of Figure 1, and Figure 5 a section on line 5—5 of Figure 4.

Referring to the drawings, 1 indicates the body of a cabinet having a back 2 hinged to its rear at 3 and a lid 4 hinged to its front at 5. The hinges are preferably of the detachable type. The body is provided with a partition 6 forming two compartments 7 and 8. Compartment 7 receives a receiving unit 9 and compartment 8 receives a loud speaking unit 10. The rear of the body 1 within compartment 7 is provided with an opening 11 through which access to the interior of the receiving unit may be had. Back 2 is provided with a partition 12 forming compartments 13 and 14. Compartment 13 houses high voltage batteries 15 and compartment 14 is provided with shelves 16 for supporting low voltage batteries 17. The connections from the batteries to the receiving unit are made through opening 9 as shown in Figure 2. Lid 4 is provided with a partition 18 substantially in the same plane as partition 6 to form compartments 19 and 20. Compartment 19 encloses the front of the receiving unit and compartment 20 may be used for housing an aerial 21 or other accessories. Back 2 and lid 4 are locked to the body by any suitable catch preferably as shown at 22. The back has binding posts 23 on its outside for the aerial and ground connections. A handle 24 of any suitable construction is secured to the top of the body by bolts 25 or otherwise.

To install the receiving unit and loud speaking unit in the body, the receiving unit is slipped into compartment 7 and secured therein and the loud speaking unit 10 is slipped into compartment 8 and secured therein. The electrical connections between the receiving unit and the loud speaker are then made. Batteries 15 and 17 are placed in back 2 preferably in the manner shown in Figure 2 and the electrical connections between the batteries and the binding posts of the receiving unit are made through opening 9 as shown in Figure 2. The aerial and ground are also connected to their respective binding posts 23 which are electrically connected to their corresponding binding posts on the receiving unit. The back is then locked to the body by a catch 22 and the receiving unit is ready for tuning in broadcast matter. After the receiving unit is tuned in and music is heard from the loud speaking unit, the volume of the music may be regulated by opening or closing lid 4 to a greater or less extent. After use, the aerial and ground connections may be disconnected and placed in the compartment 20 and the lid closed and locked to body 1 by catch 22. The complete radio outfit is thus compactly enclosed in a cabinet and may be conveniently carried to any desired place.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A radio cabinet including a body provided with a compartment for housing a receiving unit, the compartment having an opening, and a compartment for housing a speaking unit; a back connected with the body for housing batteries adapted to be connected with the receiving unit through the opening, and means connected with the body for enclosing its front.

2. A radio cabinet including a body provided with a compartment for housing a receiving unit, the compartment having an opening in its rear, and a compartment for housing a speaking unit; a back connected with the rear of the body for housing batteries adapted to be connected with the receiving unit through the opening, and means connected with the front of the body for enclosing the same.

3. A radio cabinet including a body provided with a compartment for housing a receiving unit, the compartment having an opening in its rear, and a compartment for housing a speaking unit; a back connected with the rear of the body for housing batteries adapted to be connected with the receiving unit through the opening, and a lid connected with the front of the body for enclosing the same.

4. A radio cabinet including a body having an opening and a partition in the body below the opening forming two compartments; a back connected to the body and having a partition forming two compartments, and means connected to the body for enclosing the front of the compartments.

5. A radio cabinet including a body having an opening in the rear and a partition in the body, below the opening, forming two compartments; a back hinged to the rear of the body and having a partition forming two compartments, and a lid hinged to the front of the body for enclosing the same.

6. A radio cabinet including a body having an opening in the rear and a partition in the body, below the opening, forming two compartments; a back hinged to the rear of the body and having a partition forming two compartments, and a lid hinged to the front of the body and having a partition forming two compartments.

7. A radio cabinet including a body having an opening in the rear and a partition in the body, below the opening, forming two compartments; a back hinged to the rear of the body and having a partition forming two compartments, one of the compartments being provided with shelves, and a lid hinged to the front of the body and having a partition forming two compartments, the partition being in substantially the same plane as the partition in the body.

In testimony whereof I have signed my name to this specification in the presence of two subscribing witnesses.

ISADOR RUDOLPH

Witnesses:
CHAS. E. POTTS,
ELIZABETH GABEL.